US006556734B1

(12) United States Patent
Bischel et al.

(10) Patent No.: US 6,556,734 B1
(45) Date of Patent: Apr. 29, 2003

(54) ELECTRICAL CONNECTION SCHEME FOR OPTICAL DEVICES

(75) Inventors: William K. Bischel, Menlo Park, CA (US); David A. G. Deacon, Los Altos, CA (US); Michael J. Brinkman, Redwood City, CA (US); Simon J. Field, Palo Alto, CA (US); Linda A. Whittelsey, Sunnyvale, CA (US)

(73) Assignee: Gemfire Corporation, Fremont, CA (US)

( * ) Notice: Subject to any disclaimer, the term of this patent is extended or adjusted under 35 U.S.C. 154(b) by 0 days.

(21) Appl. No.: 09/294,636

(22) Filed: Apr. 19, 1999

(51) Int. Cl.[7] ................................................ G02B 6/12
(52) U.S. Cl. .................... 385/14; 385/27; 385/130; 385/131; 385/132; 385/901
(58) Field of Search ..................... 385/14, 130, 131, 385/132, 901, 27

(56) References Cited

U.S. PATENT DOCUMENTS

| 5,009,483 | A | | 4/1991 | Rockweel, III | 350/96.24 |
|---|---|---|---|---|---|
| 5,544,268 | A | | 8/1996 | Bishel et al. | |
| 5,664,032 | A | | 9/1997 | Bischel et al. | 385/4 |
| 5,990,994 | A | | 11/1999 | Stephenson | |
| 6,166,796 | A | * | 12/2000 | Stephenson | 349/149 |

FOREIGN PATENT DOCUMENTS

EP  0 883 328 A1  12/1998  ............. H05K/1/02

* cited by examiner

Primary Examiner—Cassandra Spyrou
Assistant Examiner—Craig Curtis
(74) Attorney, Agent, or Firm—Warren S. Wolfeld; Haynes Beffel & Wolfeld LLP; Charles B. Katz

(57) ABSTRACT

An optical device includes at least a first and second electrical conductors. At least one optical layer overlies at least a portion of the first and second electrical conductors. An applicator is positioned proximate to said at least one optical layer to selectively redirect light from the optical layer. An electrical coupling path between said at least one applicator and one of said first or second electrical conductors, at least a portion of the coupling path traversing said at least one optical layer. At least one optical waveguide may be formed in an optical layer above said electrical conductors. A feature is located to receive light redirected by the applicator and at least one electrical coupling path, which may be included in said feature, couples the applicator and at least one of said plurality of conductors. In a further aspect, a method for manufacturing an optical device is disclosed. The method comprises the steps of: providing a substrate; constructing at least a first electrical conductor in a first substantially planar layer; forming an optical guiding structure in an optical layer; constructing at least one applicator capable of redirecting optical energy; constructing a feature; and electrically coupling said applicator and said at least first electrical conductor.

36 Claims, 5 Drawing Sheets

ELECTRICAL CONNECTION SCHEME FOR OPTICAL DEVICES

This invention was made with Government support under contract DASG60-96-C-0149 awarded by the U.S. Army Space and Missile Defense Command. The Government has certain rights in the invention.

FIELD OF THE INVENTION

This invention relates to the interconnection between two or more electrical layers on opposing faces of an optical structure of an integrated optical circuit, and provides a scheme for obtaining electrical interconnection between the electrical layers to enable denser component layout and consequently a higher degree of component integration on a single substrate. In certain embodiments, the electrical interconnect function is combined with an optical function, such as an out of plane reflector.

BACKGROUND OF THE INVENTION

In integrated electrical circuits, the use of electrical interconnects (vias) through electrically insulating elements to connect electronic and electrical elements otherwise separated by the insulating element is known in the prior art. Electrical vias are typically prepared by creating holes in the insulating elements that separate the electronic/electrical elements to be connected, applying a conductive metallization layer to the surfaces of the holes within the insulating layers, and finally patterning the metal layer to ensure an electrical pathway between this metallization layer within the holes and the electronic/electrical elements being connected through the insulating element. The diameter of the holes must be consistent with the electrical current being carried and the resistivity of the metallization layer.

Paralleling the history of the integrated electrical circuits (IC's), integrated optical devices are shrinking in size even as the number of functional elements in the devices increases. This increasing density creates problems in the design and subsequent manufacture of such devices. Consider now the situation with electrical interconnection between and among integrated optical and electrical components.

Previously, in integrated optical devices, individual components and devices have been demonstrated which are typically electrically connected by the use of surface probes or edge connectors. Such coupling techniques are only possible with the low level of integration of electrically activated integrated optical components that has previously been contemplated. As the complexity of the integrated optical circuit increases and the density of the electrically activated components increases, it eventually becomes impossible to lay out the electrical connections in a single conducting or electrical layer.

It would therefore be advantageous if the use of surface probes or edge connectors could be replaced by an alternative connector which would save valuable surface space, and if other elements in the integrated optical device could also function as vias. Design options would increase, and manufacturing processes (costs) would be reduced.

Integrated optical devices find widespread and practical uses in many industries including the communications industry and the flat panel display industry. There are functional reasons why some elements have to be placed in certain critical relationship to one another. In some devices, certain elements must be separated by minimum distances. For example, electrical elements can "short" if too tightly spaced, and similarly optical elements can unintentionally couple if too tightly spaced. Conversely, in some devices, some elements must be in very close proximity and alignment one with another. For example, electrically operated optical waveguide switches require a critical spatial relationship with the waveguides they control. The increasing density and limitations on the layout of electrical and optical elements both lead to the desire to use alternative electrical interconnect techniques. In some cases, the desired component density will not be achievable without putting optical/electrical components in multiple layers.

Another route to higher density and facilitating the layout of the various elements is through the use of multi-functional elements. Space can be saved and manufacturing processes simplified or eliminated if one element can fulfill two or more functions, increasing design options and reducing cost.

The manufacturing process for electrical interconnect vias is currently seen as a distinct process consisting of multiple steps. In addition, only a limited space may be available for vias to connect or pass through two or more layers, which may contain multiple optical elements which may severely restrict the available pathways for the vias to occupy.

The present invention addresses this need and other needs as described in the following description.

SUMMARY OF THE INVENTION

In one aspect, the invention comprises an optical device. The device includes at least first and second electrical conductors. At least one optical layer overlies at least a portion of said first and second electrical conductors. An applicator is positioned proximate to said at least one optical layer to selectively redirect light from or within said optical layer in response to a control signal. An electrical coupling path is provided between said at least one applicator and one of said first or second electrical conductors, at least a portion of the electrical coupling path traversing at least a portion of said one optical layer.

In a further aspect, the invention comprises a display in which at least one optical waveguide is formed in an optical layer above said electrical conductors. At least one feature is located to receive light redirected from the waveguide by the action of the activated applicator; and at least one electrical coupling path included in said feature couples the applicator and at least one of said plurality of conductors.

In accordance with the invention, the optical layer may comprise a first cladding layer and a second cladding layer on opposing sides of a core layer.

In various embodiments of the invention, the feature may comprise: a pixel; an optical redirector; an optical re-emitter; an optical re-radiator; a thermal conductor; a via formed in said optical layer, or a combination thereof.

In further embodiments of the invention, the applicator may comprise a heating element for a thermo-optic switch or control an optical redirector which operates by reflection. Still further, said applicator may control an optical redirector which operates by suppressing or inducing waveguiding properties in an optical waveguide.

In yet another embodiment, the invention comprises a method for manufacturing an optical device. The method comprises the steps of providing a substrate; constructing at least a first electrical conductor in a first substantially planar layer; forming an optical guiding structure in an optical layer; constructing at least one applicator; constructing a feature; and forming an electrical coupling path between the applicator and said at least first electrical conductor.

In further embodiments, the invention includes forming the electrical coupling path in the feature, and/or forming said electrical coupling through the optical layer.

BRIEF DESCRIPTION OF THE DRAWINGS

The invention will be described with respect to the particular embodiments thereof Other objects, features, and advantages of the invention will become apparent with reference to the specification and drawings in which.

DETAILED DESCRIPTION OF THE INVENTION

Figure 1:
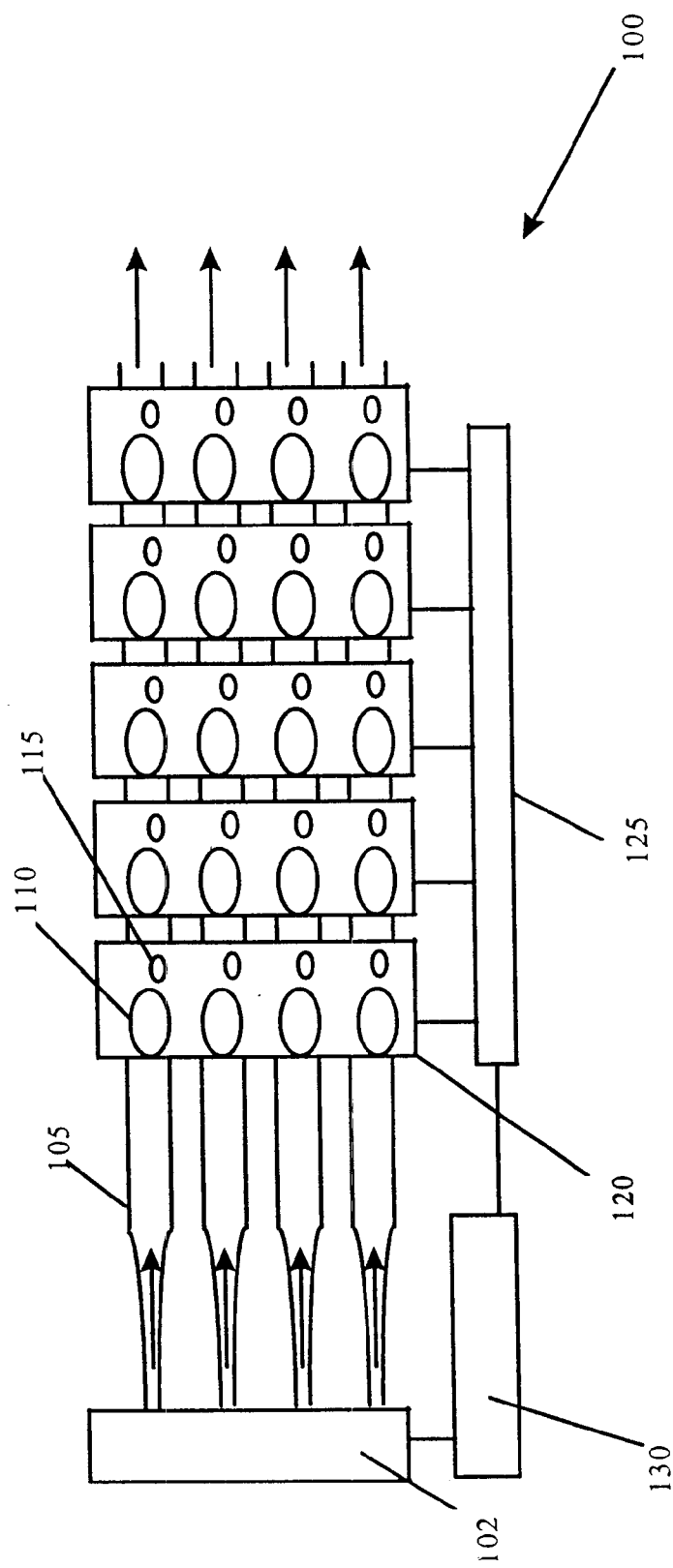
FIG. 1 is a block diagram of an integrated optical waveguide array system.

One embodiment of this invention relates to the interconnection structure of one (or more) electrical layers on opposing faces of the optical structure of an integrated circuit. The interconnection structure provides for electrical interconnection between one or more of the electrical layers to enable denser component layout and consequently a higher degree of component integration on a single substrate (a well as a simplified manufacturing process). Individual or matrix addressability of applicators is enabled even at high densities of integration. In another embodiment of the invention, a method for constructing an optical integrated circuit containing the aforementioned interconnection, is provided.

Previously, in integrated optical devices, individual components and devices have been demonstrated which are typically electrically connected by the use of surface probes or edge connectors. Such coupling techniques are only possible with the low level of integration of electrically activated integrated optical components that has previously been contemplated. As the complexity of the integrated optical circuit increases and the density of the electrically activated components increases, it eventually becomes impossible to lay out the electrical connections in a single conducting or electrical layer. In addition, the separate electrical distribution layer, combined with the electrical interconnection vias, enables routing between optical components that could not otherwise be connected at the desired spatial density.

Optical redirectors are elements or a combination of elements, including an applicator, that redirect optical energy from a first direction to a second direction. In some instances this can be the creation of an absolutely new structure, in other cases it can be the activation of a structure that was predefined in a dormant state in the device. The applicator is a structure that, when activated by a control signal, enables the redirector to redirect optical energy as desired.

An applicator is typically an electrode type structure consisting of either a single electrode that acts by itself or multiple electrodes that act together to activate the redirector structure. Electrode type structures, as used herein, is used in a broad sense, and may include structures such as resistive heating elements, for example, which are utilized in thermo-optic devices to activate such a redirector structure.

Advantageously, features, or combinations of features can play an additional role in optical circuits. For the purposes of explanation, a feature is any distinguishable structure which serves some useful purpose. Features serve structurally to enable optical, mechanical, thermal or other such mechanisms to occur.

Examples of features include, but are not limited to, individual lead terminations on optical connectors, display structures, data storage structures, optical distribution structures, pixels, electrical vias, redirectors (in-plane or out-of-plane), re-emitters, re-radiators, thermal radiators, alignment features, etc.

In the display industry, pixels are examples of what are referred to as optical "features." Optical features such as pixels are activated when they are energized by optical energy from a correctly functioning optical source.

In certain embodiments, the electrical interconnect function is combined with another feature in the integrated optical circuit, such as the provision of an out-of-plane reflector at selected locations over the circuit. In other embodiments, the electrical interconnect function is combined with the existing alignment holes located on an integrated circuit board, which enable additional devices, circuit boards, lenses or fibers, for example, to be aligned to the integrated optical circuit in question.

The electrical interconnect function may be combined with a via—a penetration through a layer of a device. Usually, vias are considered as holes through a layer of a device, however vias may be "plugged" after manufacture, as a consequence of their function, for cosmetic or other reasons, these totally or partially "plugged" or "filled in" holes are also referred to as vias. Alternatively, the electrical interconnect function may be combined with heat sinks or other such thermal conductors or radiators which may traverse the layers of the optical circuit.

As stated above, one embodiment of this invention relates to the interconnection structure of one (or more) electrical layers on opposing faces of the optical structure of an integrated circuit. The use of separate electrical layers on opposing faces of the optical waveguide structure also enables each layer to be optimized for its particular function (in terms of material type, fabrication technique and dimensions), without compromising the performance of the device. For instance, the electrical distribution layer beneath the waveguide structure may be optimized for high current carrying capacity with low voltage drop, so that all electrically connected components in the integrated optical circuit are activated at the same voltage for uniform performance independent oft heir position in the array and the distance from the input electrical connections to the component. Alternatively, the properties of the electrical distribution layer may be controllably varied across the array to provide a predetermined level of performance variation between components fabricated across the array.

Simultaneously, the electrical activation layer disposed on top of the waveguide structure can be independently optimized for maximum interaction with the optical guided mode in the integrated optical circuit, (to maximize device efficiency) and for uniformity of performance of the array of components in the circuit. The electrical activation layer may additionally be formed into a plurality of electrically activated applicators, the shape or layout of which may be optimized so as not to interfere with light propagation other than at the predetermined "application" points within the array. Compare this with the case where only a single electrical layer on the top surface of the optical structure were to be used to connect optical applicators (without an underlying electrical distribution circuit), the high density of electrical distribution electrodes required for individual addressability of a dense array of optical applicators would severely limit the space available for (and even the capability of achieving) emission of light out of the top surface of the structure, for instance for viewing a display. (It should be recognized that the terms "above," "below," "top," and "bottom" are used to denote position relative to the optical layer and are not intended to refer to different parts of the structure if the structure is inverted or rotated.) For embodiments in which light coupling from the top surface of the device is not a requirement, multiple layers of electrical circuitry could be situated on the top surface of the optical waveguide structure, each separated by an insulating layer (or filler) to prevent cross talk and short circuits. However, for some active components, especially thermo-optic (TO) components, the addition of a material layer directly over the component severely effects the device performance. For instance, a TO applicator overlaid with a layer of the same material and thickness as that on which it is disposed, suffers around a factor of two increase in the electrical power required to reach a given optical switching efficiency as compared to the same applicator overlaid by air, as heat is conducted both up and down into the adjacent materials. Air acts as a good thermal insulator and consequently there is little heat lost above the air covered applicator. Thus, for thermo-optic devices, it is desirable to place the electrical distribution circuit below the waveguide structure so that the active components can be overlaid by an effective thermal insulator, such as air.

Examples of the use of integrated optic circuits with densely integrated component arrays include flat panel displays and optical switch arrays for data routing in communications, as illustrated in FIG. 1. In these examples, the integrated optical circuit 100 may consist for instance of an array of optical guiding structures 105 with an array of optical beam redirectors 110 superimposed at certain predetermined locations. A light source 102 can be coupled into the optical guiding structure depending upon the proposed use of the device.

The light source may have any wavelength in the visible, ultraviolet, or infrared region of the spectrum at which the waveguide array is transmissive, and may have a single or multiple emission regions, and may include devices such as lasers, light emitting diodes, incandescent and fluorescent sources.

Coupling methods include for example, but are not limited to, evanescent coupling, lens coupling, fiber coupling, grating coupling, and butt coupling. Evanescent coupling includes architectures in which two optical guiding structures are placed close to each other so that some light in one couples into the other. Grating coupling includes architectures in which a grating is fabricated in or near the input optical guiding structure such that light emerging from the source strikes the grating thus coupling a portion of the diffracted beam into the input optical guiding structure. Butt coupling includes architectures in which the light source facet is in close proximity to the input surface of the guiding structure such that the direction of propagation of the light source is the same as that of the guiding structure. In another embodiment, the laser or light emitting diode source is integrated onto the same substrate as the optical guiding structure array, instead of being fabricated separately and subsequently attached.

The controllable optical redirectors 110 are controlled by control electrodes 120, which may in one embodiment be formed in the electrical distribution layer, which ultimately dictate which column of redirectors is activated at any time. The control unit 125 provides electrical drive signals to the control electrodes as required to activate the desired redirectors in a desired sequence. The system control module 130 synchronizes the control unit 125 and the light source 102 to provide operation of the integrated optical device. An alternative control unit and layout of control electrodes would allow individual addressing of any desired isolated redirector. For example, groups of redirectors that are not arrayed in columns alternately may be activated simultaneously.

Light is coupled out of the waveguide 105 at the beam redirector 110 and may be coupled either into a receiving structure, for example a second waveguide (not shown), and/or directed towards a feature comprising for example an out of plane mirror, re-radiator, or pixel, for example, shown as 115 in FIG. 1. An optical redirector may consist of, for instance, a scatterer, a redirector, a thermo-optically activated total (or partial) internal reflection switch, a waveguide switch which controllably alters the waveguide properties in a predefined switch region of the waveguide, such as a mode cut-off modulator or grating. The applicators may activate thermo-optically, but may alternatively activate electro-optically. However, utilization of an electro-optically activated redirector requires the selection of an electro-optic optical layer material, in one embodiment the optical core layer, to enable the applicator to function, and electrodes disposed to apply an electric field to the device.

Figure 2:
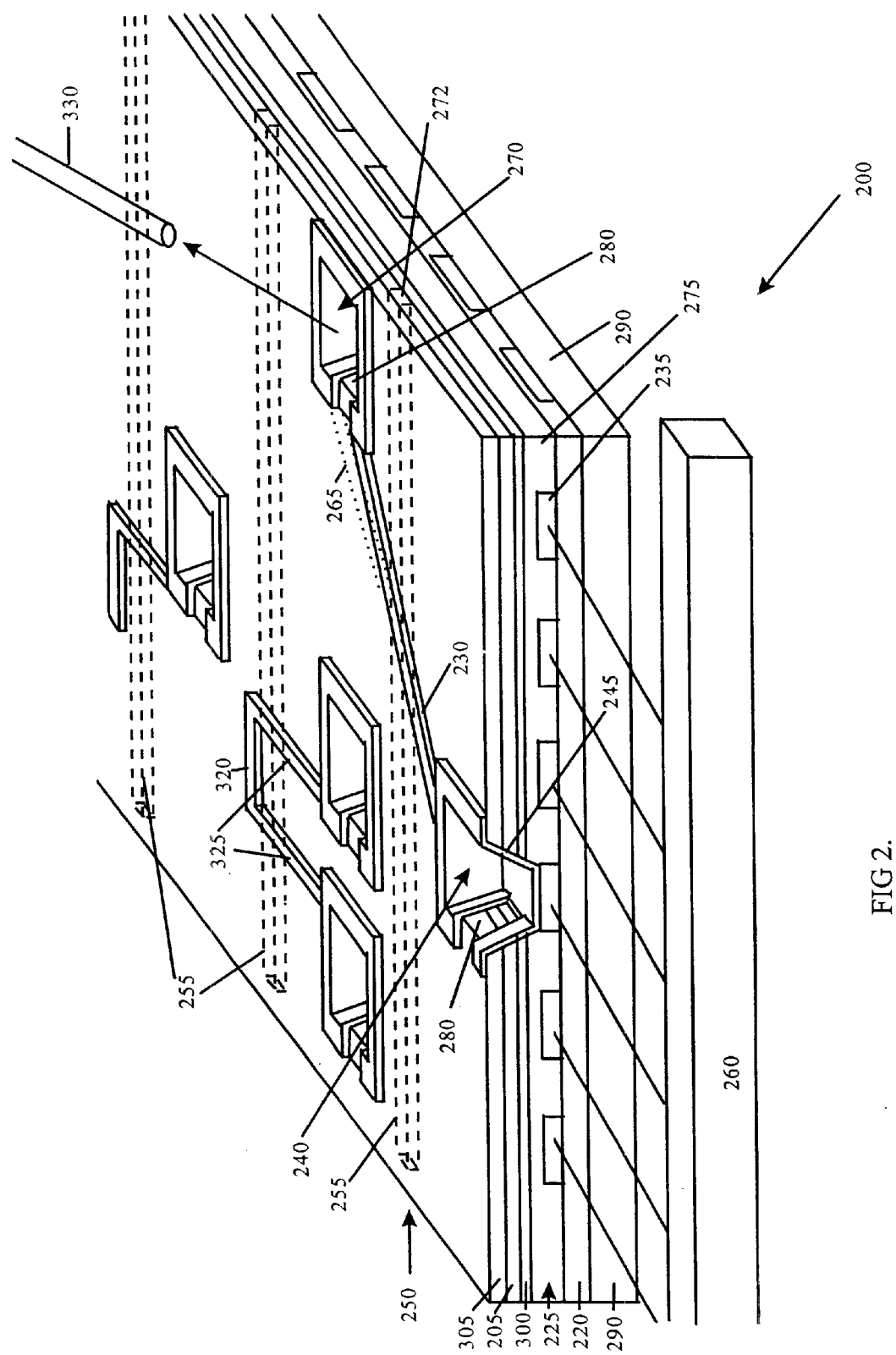
FIG. 2 illustrates schematically the switching network incorporating electrical interconnect vias according to the present invention.
Figure 3:
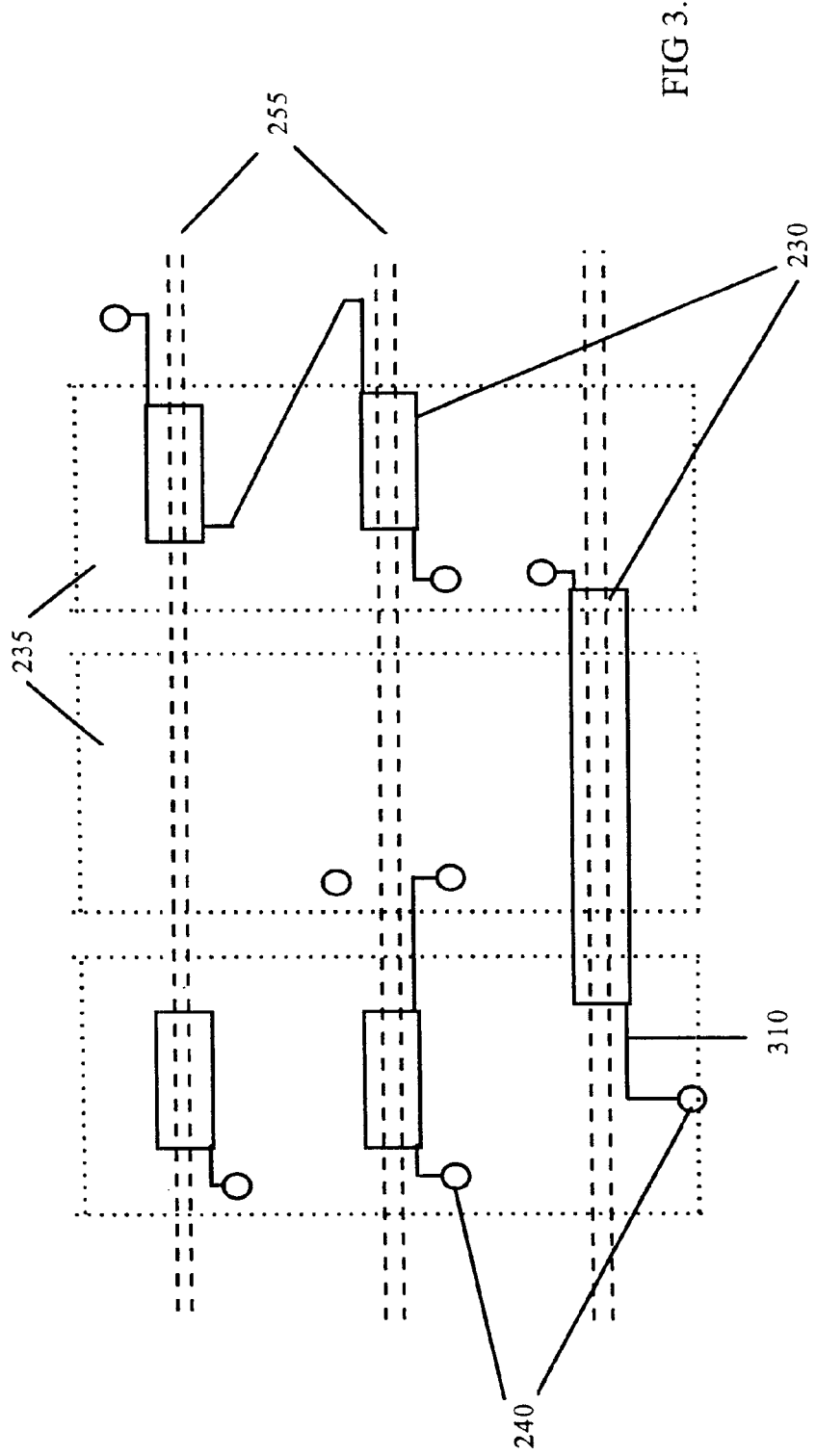
FIG. 3 illustrates in a two-dimensional view, the switching network incorporating electrical interconnect vias according to the present invention.

A first embodiment for a large scale integration, integrated optical circuit utilizing this invention is shown in FIGS. 2 and 3 illustrating a two dimensional switching network which may be used for data routing in communications applications. The integrated optical circuit 200 is composed of two or more substantially planar electrical layers 220, 225, 230, separated by an optical layer comprising, in this example, of layers 300, 205 and 305 containing a substantially planar array of integrated optical channel waveguides 255.

Unless otherwise specified, the term "substantially" is used herein to accommodate tolerances including manufacturing tolerances and optical tolerances (for example, dielectric reflectors physically can not reflect light at all angles). Omission of the word "substantially," however, should not be taken to require that such tolerances are not to be accommodated, since no real-world manufacturing process can be perfect.

Alternatively, waveguides at substantial angles to each other, and even crossing each other, could be included in the optical circuit. The waveguides are oriented at an angle to the lower, or distribution electrode layer(s), such that the waveguides traverse more than one of the conductors 235 composing the layer(s). The upper, or activation electrical layer 230 is aligned to the optical waveguide pattern 255 and to the conductors 235 in the electrical distribution layer(s) 220, 225 which is more clearly illustrated in FIG. 3 The active elements of the integrated optical circuit consist for instance of thermo-optical or electro-optical applicators. These applicators may form total internal reflection (TIR) switches, partial internal reflection (PIR) switches, gratings, or other switches known in the art, which are arranged in proximity to the waveguides of the integrated optical circuit. An electrical coupling path forms the electrical connection between the electrical distribution layer(s) 220, 225 and the activation layer 230 and is achieved by creating a via 240 through the optical waveguide layer, and depositing and patterning interconnection metal 245, which overlays both the applicator electrode and the conductor.

Operation of the integrated optical device may be as follows. Light 250 (e.g. from a diode laser source) is coupled into one (or more) of the waveguides 255 comprising the integrated optical circuit. A voltage source 260 is applied to selected conductors 235 in the electrical distribution layer(s) causing an electrical power (in a TO embodiment) or a voltage (in an EO embodiment) to be applied to selected applicators in the electrical activation layer 230. The resulting change in the local refractive index distribution induced by the applicator interacts with the optical mode in the selected waveguide, causing light to be coupled out of the waveguide at a selected location(s). This light may be captured by a receiving structure, for example, a second waveguide 265 located proximate to the first and oriented to receive the out-coupled light. The receiving structure may be defined by an index boundary such as side walls or a pixel, a second channel waveguide, a planar waveguide, or a free-space propagation segment in the bulk substrate, or it may simply be a planar waveguide resulting from the multiple planar layers of the optical stack. In this latter case, the second waveguide structure will abut directly the first waveguide. Note that the planar waveguide may contain other structures such as reflectors and refractive index boundaries (which may be induced by an applicator) that serve to direct the redirected beam of light to a desired output port. The light may then be routed (possibly by the action of further applicator(s)) to a different exit port 270 from the integrated optical circuit than would have resulted had the applicator(s) not been activated and the light 250 had been allowed to propagate undisturbed in the first waveguide 255 and exit at 272.

The exit ports from the integrated optical circuit may, for example, be in a side face of the multilayer structure (as illustrated by 272), emerge from the top surface (as illustrated by 270), or the bottom surface of the substrate. In this later cases, an out-of-plane reflector may be used to divert the light substantially out of the plane of the integrated optical circuit. This light may then be recaptured by for instance an optical fiber 330, or directed (possibly with the aid of a focusing or collimating lens) onto a detector or toward a receiving structure on a second optical integrated circuit. The out-of-plane reflector may be fabricated by creating a pit or trench through the optical core layer, with at least one angled side wall to direct the incident light out of the plane. Additionally, the angled side wall may be metallized (or coated with some other suitable material) to provide a high reflectivity for the wavelength being guided in the integrated optical circuit.

Advantageously, as illustrated in FIG. 2, the out of plane reflector or exit port may be combined with the electrical interconnect via 240 which passes through the waveguide structure between the electrical distribution layer(s) 220, 225 and activation layer 230. In this instance, the interconnect metallization may provide the additional function of high reflectivity for efficient out of plane reflection. The exit port 270 must be correctly located to intercept light from the secondary waveguide 265, or to directly collect the light out-coupled from the first waveguide 255 by the applicator 230. The interconnect metallization must additionally be patterned such that there is an input aperture 280 to the via or out of plane reflector or exit port, which is clear of such metallization, such that the outcoupled light may be admitted through the aperture into the out of plane reflector structure. Note that there is no requirement for a one-to-one correlation between vias and out-of-plane reflectors there may be individual structures that provide either or both of the described functions. In addition, there is no requirement that only one applicator in the activation layer be associated with only one via, with either more or fewer applicators than vias.

The following sections provide a more detailed description of the method of construction and operation of this first embodiment.

A first electrical layer 220, the electrical distribution layer is constructed in a first substantially planar layer on a first substrate 290, which may be either some form of inflexible material such as glass or silicon, or a flexible web like material such as Mylar® or Kapton® in a pattern according to the layout of the individual components in the integrated optical circuit. The pattern may consist of a number of conductors 235 with or without contact pads arrayed within the pattern at certain predetermined positions. More than one conduction layer (for example 220 and 225) may be incorporated with different patterns and interleaved insulating layers to prevent cross talk and short circuits. On any given electrical layer, the conductors may be arrayed substantially parallel to each other at least in a region of interest. However, on layers with only a few conductors, designs are conceivable in which there is no need for all of these few conductors to be either arrayed or substantially parallel to each other in the region of interest. Note that the conductors may also be segmented along their length(s) such that other designs can be realized. Used in this context with the term "parallel," the term "substantially" has a somewhat different meaning than set forth above. For example, conductors which are substantially parallel in the region of concern, but which fan out further along their length are, for the purposes of this application, considered to be substantially parallel to one another since, in at least the region of concern, they are substantially parallel, even though in other segments, including the fan out segment, they are not.

The electrical distribution layer(s) may be defined by any of the techniques well known in the art, such as vacuum deposition (sputter or evaporation) followed by lift off or wet etch patterning, electroplating, or other flex circuit techniques, and may consist of a metal layer or some other form of conductor such as indium tin oxide (ITO). Depending on the fabrication process used, it may be necessary to apply a filler layer 275 over the electrical layer (the conductors 235) to prevent surface height fluctuations from introducing loss in the subsequently applied optical structure. Such filler/planarization layers are well known from the VLSI silicon integrated circuit processing industry and are available for use in spin, dip and spray coating forms, in formulations that are capable of withstanding the processes utilized for the remainder of the device fabrication and which can therefore become an integral layer within the device structure such as AZ 4000™ photoresist from Hoechst Celanese, N.J.

The thickness of the electrical distribution layer and the widths of the electrodes must be chosen so that the voltage drop across the electrode is small compared to that across the applicators. This is particularly important for TO applicator arrays in which multiple devices may be connected in parallel and small voltage drops in the conductor may cause large variation in the drive uniformity of the devices.

The optical waveguide structure is then constructed from a second series of substantially planar layers disposed on the upper surface of the electrical distribution layer (the surface furthest from the substrate layer). The thickness of the component layers and the dimensions of the waveguide itself can be calculated using techniques well known to those skilled in the art given the optical properties of the selected materials which are chosen for use and the characteristics of the light energy which will eventually be launched into the waveguides. The parameters necessary to design an optical waveguide structure to guide light at a particular wavelength are well known in the art and may be found for instance in Nishihara, et al., "Optical Integrated Circuits," McGraw Hill, 1989, incorporated herein by reference in its entirety.

An optical lower cladding 300 or buffer layer is applied over the electrical distribution layer and/or filler layer 225 to prevent the optical mode in the integrated optical circuit from interacting with the electrical distribution layer and suffering from a high propagation loss due to optical absorption. (If the evanescent field of the optical waveguide mode has not decayed to zero within the cladding or buffer layer there will be some finite absorption within the (metallic) electrical layer, which over the length of the guide can result in significant reduction of the optical energy propagating within the waveguide.) This layer may be omitted if the filler material has the appropriate refractive index, thickness and other properties to function as a waveguide lower cladding layer.

The lower cladding layer 3 0 may be deposited by one of the many available methods (dependent on the material used, which may for instance be polymer, glass or other hard oxide) such as spin, spray, dip, slot-die, or flash evaporation coating for polymer materials, vacuum deposition (e.g. chemical vapor deposition, CVD, or plasma enhanced CVD) for hard oxide or nitride materials such as $SiO_2$ or SiON. Spin-on-glasses are another material candidate with relatively simple spin and bake processing requirements. The top surface of the resulting lower cladding layer (the surface furthest from the substrate) should be optically smooth and defect free so as to result in low scattering of the optical mode at the core-cladding interface and subsequently in a low optical waveguide propagation loss in the integrated optical circuit. In addition the cladding layer should exhibit low absorption and scattering at the wavelength(s) to be guided in the integrated optical structure.

An optical core layer 205 is next applied over the lower cladding layer 300 to provide an optical waveguiding structure. The combination of the refractive index difference between the core and the lower and upper cladding layers, and the thickness of the core layer, must be sufficient to provide confinement for at least one propagating transverse mode in the structure. The core layer refractive index must be greater than either of the cladding layers, and the combination of the index difference between each respective (lower and upper) cladding layer and the core, and the thickness of the respective cladding layer, should be sufficient to ensure that the evanescent field of the optical mode in the cladding layer has decayed away to substantially zero before it reaches the outermost boundary of the cladding. Equations for determining appropriate optical layer thickness'are well known in the art, and can be found, for example, in Nishihara, et al., "Optical Integrated Circuits," McGraw Hill, 1989.

The deposition process for the core layer is again dependent on the material choice, as for the lower cladding layer. Suitable choices for the core layer are polymer materials (e.g. PMMA or other acrylate materials) or doped $SiO_2$ layers (e.g. germanium doped $SiO_2$) or glasses, with the constraints that the material should have both a higher index than the cladding layers and good optical transparency (low absorption and scattering losses) for the wavelength(s) to be propagated through the integrated optical circuit, and again the layer should have low surface roughness to prevent excess propagation loss due to scattering at the interlayer interfaces.

An array of two dimensional channel waveguide structures may be defined by any of the techniques well known in the art, such as, for example, reactive ion etching (RIE) of the lower cladding, RIE of the core, photobleaching, photodefinition, laser ablation, ion implantation, rib loaded on top cladding etc., with a pattern defined by the layout of the integrated optical circuit. Additionally, patterned indiffusion of a species (such as $Ag^+$ions in glass) into a planar core layer may be used to define the waveguide array. This pattern includes an array of first channel waveguides 255 oriented at some angle to the conductors 235 of the electrical distribution layer 220, 225 and may include a number of secondary waveguides 265 disposed to receive light coupled out from the array of first waveguides at selected locations (defined by the electrical application layer 230). The array of waveguides overlaps at least a portion of more than one of the conductors composing the electrical distribution layer.

Following the core layer deposition, a top cladding 305 (or buffer layer) should be provided to isolate the optical waveguide mode from the electrode structures and other features that are to be defined on the top surface of structure, except under certain defined circumstances and in predetermined areas. The combination of the index difference between the core and the top cladding and the cladding thickness should be sufficient to cause the evanescent field of the optical mode to have decayed to substantially zero before it reaches the outer surface of the cladding to prevent absorption losses from occurring in overlying areas.

As an alternative waveguide application approach, the waveguides may be fabricated on a separate substrate, such as a flexible web-like material, and then laminated or glued onto the electrical layer to form the combined electrical/optical substrate structure.

Once the optical guiding structure has been completed, the electrical activation layer 230 is constructed in a third series of planar layer(s) and patterned to define the active areas of the device. Construction may be performed by any of a number of deposition methods known in the art (e.g. sputtering, evaporation), and the electrical activation layer may be composed of a metallic or non metallic (e.g. ITO) conductor. The type of conductor used is dependent on the type of active component being fabricated. For instance, a thermo-optic applicator array utilizes an applicator consisting of a resistive heating element that dissipates electrical power into the optical layer upon activation, thereby increasing the temperature and altering the refractive index distribution of a. localized region of the waveguide structure, thus interacting with light propagating in the waveguide. An example of a conductor suitable for his purpose is a thin film of nickel-chromium alloy, NiCr. For electro-optically activated devices, voltage rather than current flow is transferred through the electrical activation layer, so the resistive properties of the conductor are less important and the range of suitable materials is increased (e.g. chrome, NiCr, Ti, Au, Ag, etc.).

Standard photolithographic processes may be used to pattern the electrical activation layer, involving, for instance, resist spinning, soft baking, mask alignment, exposure, development, wet or dry metal etch and resist stripping. The pattern of the electrical activation layer must be aligned relative to both the electrical distribution layer and the optical waveguide structure so that the applicators defined in the electrical activation layer are proximate to the waveguides and thus able to affect the propagation of light within the waveguides of the integrated optical circuit when activated. In addition, locations must be defined to provide connections between the electrical activation layer and electrical distribution layers for electrical interconnection, without unwanted interference with the optical waveguide propagation. Described below is an alternative process for defining the electrical activation layer in which the electrical interconnection and electrical activation layer deposition steps are combined after the fabrication of the vias.

To provide an electrical coupling path 310 (an electrical connection which is illustrated in FIG. 3) between the electrical activation layer 230 and electrical distribution layer 220, 225, a via, in this example a hole 240, must be cut through the optical waveguide structure. This must be performed only in specific predetermined locations to prevent unwanted interference or intersection with waveguides in the integrated optical circuit. The via hole should terminate at least partially on one of the conductors 235 of the electrical distribution layer(s) 220, 225 or on one of the contact pads which may be distributed throughout the pattern. The via may be fabricated by any of the known surface etching techniques such as reactive ion etching, wet etching, excimer laser ablation etc. The specific process used will be dependent on the optical waveguide structure material system, e.g. polymers can be etched by RIE typically in fluorine based chemistry and excimer laser ablation, while $SiO_2$ based systems can additionally be etched by wet etchants. The via structure should ideally be fabricated with smooth side walls and no overhanging edges so that a continuous, conformal, metallization layer can be applied.

Once the via has been fabricated through the optical waveguide structure to reveal the electrical distribution layer below, the interconnect material 245, for example an electrically-conductive metal layer, is applied to create the electrical coupling path. Formation of the interconnect may be performed using vacuum deposition techniques (such as sputtering or evaporation), which may be combined with (or replaced by) an electro-plating processes. The principal functionality of the interconnect material is to provide a robust, low resistance contact from the electrical distribution layer, through the optical waveguide structure to the electrical activation layer and thus the applicators on the upper surface. The material should therefore adhere well to the electrical distribution layer, the via walls, the top surface of the optical waveguide structure and the electrical activation layer. One suitable material would be silver. The interconnect material layer should be continuous with few pinholes, breaks or voids which add to the connection resistance. Lithographic patterning may be used to define the interconnect material pattern, in which material is removed from areas where it is unwanted and where it would otherwise create short circuits between separate activation elements on the electrical activation layer. Wet etching may be used to remove unwanted interconnect material, after the deposition, exposure and development of a photoresist layer.

An alternative definition process for the electrical activation layer consists of depositing the electrical activation layer material and the interconnection material (for example a metallization layer) in the same deposition step. Depending on the requirements for the electrical activation layer, the metallization process may consist of the sequential deposition of a number of different material layers. For instance, in a thermo-optic device the metallization might consist of a thin layer of NiCr to form the activation resistive elements. The electrical coupling path may be formed by depositing a layer of silver on top of the resistive layer. This layer may alternatively be any electrically conductive material that provides a current path from the electrical distribution layer to the applicators, through the via. In this process, the lithographic patterning of the multi-layer material structure would involve a number of different etch steps to remove each of the materials from areas where they are not utilized for device functionality (e.g. the NiCr must be patterned into the applicator shape, and the Ag must be removed from the NiCr in the region of the applicator to provide the required resistance for operation).

Depending on the device embodiment, an electrical circuit may be formed from one conductor 235 of the electrical distribution layer 225, up through the metallized via 240, across the applicator of the electrical activation layer 230, down through a second via 270 and returning to a different conductor of the electrical distribution layer 225, or a conductor on a different electrical layer 220 within the electrical distribution layers.

In general, the circuit may traverse one or more optical waveguides of the optical waveguide structure, but this is dependent on the device architecture. For instance, a TIR (or PIR) typically has an applicator that starts on one side of the waveguide (far enough from the guide to interact with substantially all the energy in the evanescent fields of the guided mode), and then traverses the waveguide center to end on the far side. For an electro-optic device (requiring an electro-optically active material within the waveguide structure) there is no need to complete the electric circuit, as the application of a voltage is all that is required for activation. For a thermo-optic device, the electric circuit must be completed so a current can flow and provide power to induce a temperature change and a refractive index change in the optical layer proximate the applicator.

Other device structures may not require the applicator to cross the waveguide. For example, structures such as directional couplers or other devices that affect the mode shape may allow for connection to either side of the waveguide with no obvious crossing. Alternatively, a waveguide applicator which controllably destroys the waveguide properties in a predefined switch region of the waveguide structure may include an activation electrode 320 that is positioned so there is no requirement for the electrical circuit to cross the waveguide. In this case, the electrical connections 325 can both be made to one side of the optical structure. In a second embodiment, utilizing application of a voltage to the electrical activation layer rather than a current, there is no requirement to complete the electrical circuit through a second via down to the electrical distribution layer.

Additionally, the electrical interconnect function may be advantageously combined with an optical function within the integrated optical circuit. An example of this is the use of the via as an out-of-plane reflector, to divert light that was guided in the plane of the integrated optical circuit to propagate in free space at some angle to the circuit plane. This can be achieved by fabricating the via structure with angled side walls, which is advantageous for the electrical interconnect function as well as making continuous metallization of the structure easier to achieve. In this instance the metallization layer applied for the electrical interconnect should also display high reflectivity at the wavelength(s) being guided within the integrated optical circuit—for instance silver can provide both high conductivity and high reflectivity for the visible and infra red simultaneously. The lithographic patterning step used to define the interconnect metal additionally removes the interconnect metal from selected areas 280 of the via so that light from the integrated optical circuit is able to enter the beam re-director (via) before being reflected out of the plane of the circuit.

For this dual use of the via for electrical and optical functions, additional constraints are placed on the position of the via relative to the two electrical layers and the waveguide array. Not only does the via have to connect the upper and lower electrical layers, but it must also be positioned to accept light from a secondary waveguide 265 or directly out-coupled from a first waveguide 255. Thus alignment between the waveguide array, the electrical activation layer, the electrical distribution layer and the via pattern must be maintained through the fabrication process. The tolerances involved in this alignment are dependent on the dimensions of the features on each of the layers. Device design should be performed so as to maximize the allowable alignment error between layers so that high yield manufacturing can be achieved.

Several applicators may be electrically connected in series or parallel on the electrical activation layer with the electrical coupling path between the applicators not necessarily traversing through any portion of the optical layer between the applicators. This approach will reduce the number of vias, thus enabling larger vias and reducing the alignment tolerances for patterning the electrical coupling path and the via placement and size. Specific desired connections between applicators can be created with a combination of electrical coupling paths, each of which may utilize either vias to connect to the conductor layer or electrical connections entirely within the electrical activation layer.

In order to avoid unnecessary repetition, it should be understood that the variations described in reference to FIGS. 2 and 3 apply to the embodiments described below, and that the variations described in reference to the figures below also apply to FIGS. 2 and 3.

Figure 4:
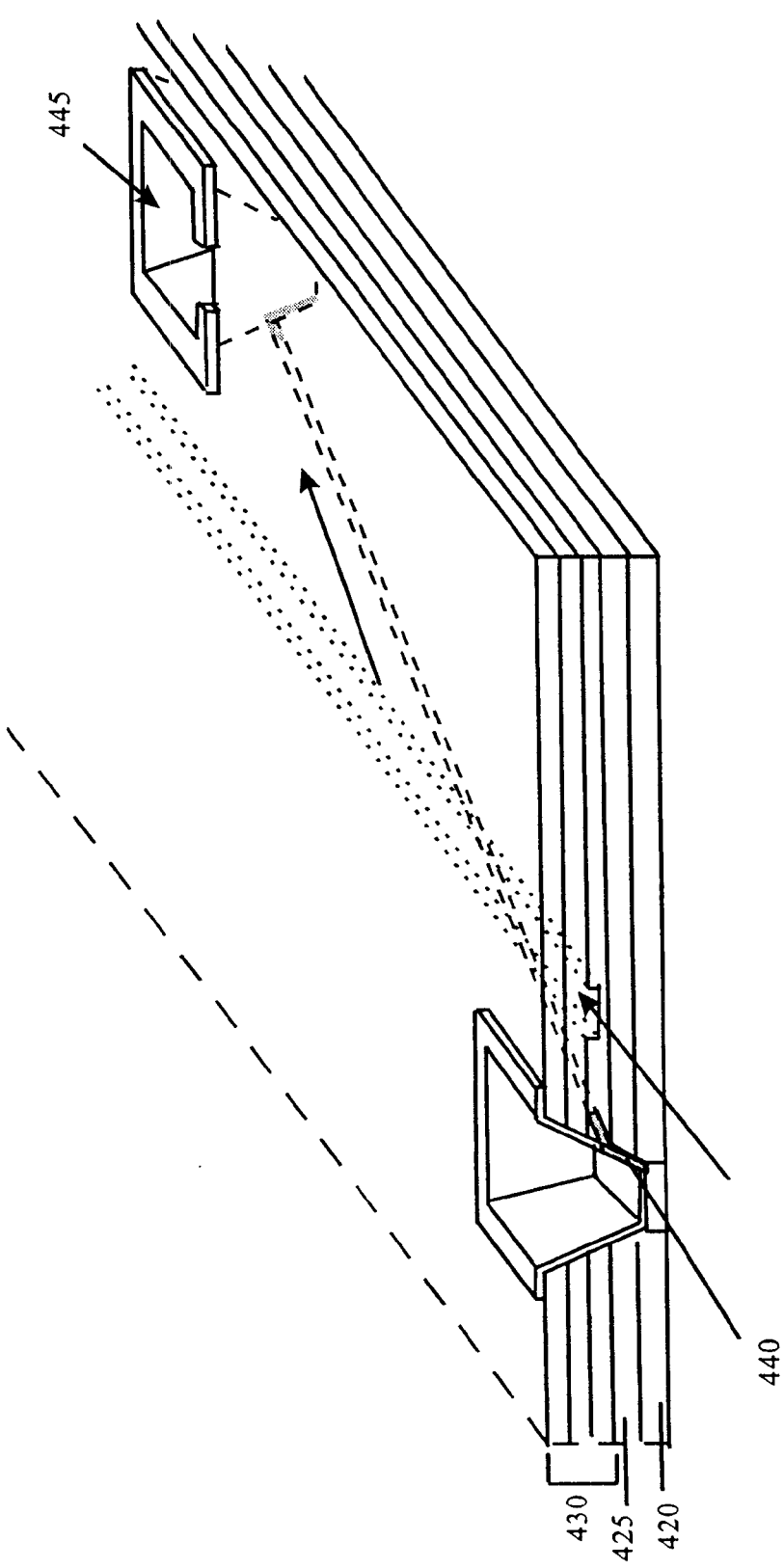
FIG. 4 illustrates schematically an optical waveguide device incorporating an applicator and an electrical interconnect via according to the present invention.

In another embodiment of the invention illustrated in FIG. 4, both the electrical distribution layer 420 and the activation layer 425 are disposed on the same face of the optical guiding structure 430 (the waveguide) separated by an interleaved insulating layer. In this embodiment, the electrical coupling path 440 is disposed between the electrical distribution and the activation layers, but does not pass through the optical guiding structure. However, the electrical via interconnect in this embodiment does combine the electrical interconnect function with an optical function in the integrated optical circuit, for example a pixel 445. The electrical via interconnection is formed in the lower portion of the pixel structure. The utilization of multi-functional elements in this layout once again ultimately enables space to be used effectively and manufacturing steps to be reduced by enabling the optical function structure to also serve as a pathway for the electrical interconnect.

Figure 5:
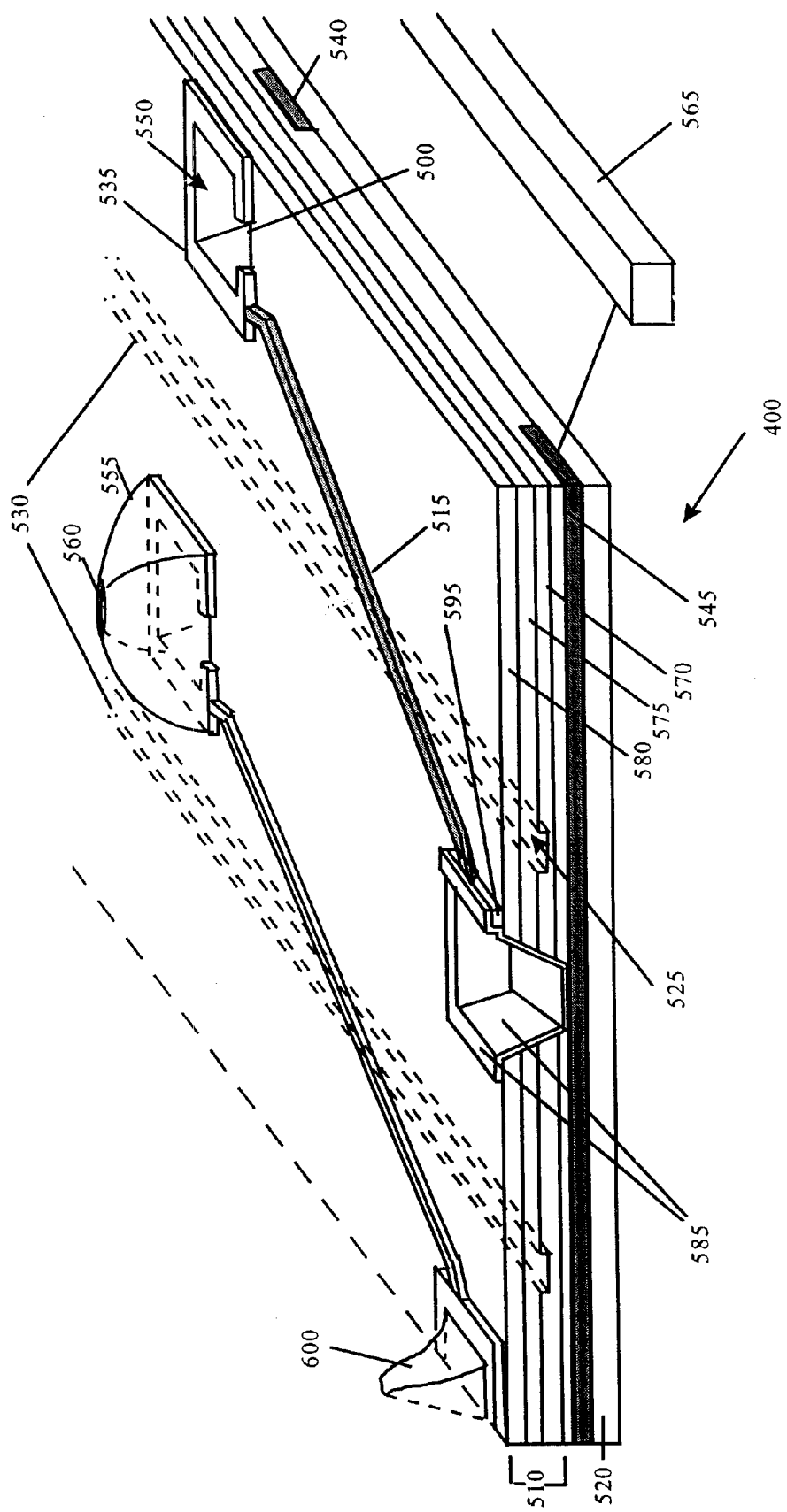
FIG. 5 illustrates schematically an optical waveguide display system incorporating thermo-optic applicators and electrical interconnect vias according to another embodiment of the present invention.

In a further embodiment of the invention, thermo-optic (TO) reflection switches (TIR or PIR for example), grating switches or other optical waveguide switches that are known in the art, are used as a.basis for a flat panel display. See, for example, Bischel, et al., U.S. Pat. No. 5,544,268, and Rockwell, U.S. Pat. No. 5,009,483, both incorporated by reference herein. With reference to FIG. 5, a waveguide display 400 consists of an electrical activation layer 515, an optical waveguide structure 510, and electrical distribution layer 545 disposed on a suitable substrate 520. Light 525 is coupled from an optical source into the optical waveguide structure 510 which contains channel waveguides 530 forming the rows (or columns) of the display. Light continues to propagate along the waveguides until it is redirected from the waveguides at specific locations due to the influence of TO applicators in the electrical activation layer 515. When activated, the TO applicators cause the light propagating along the waveguide to be deflected from the waveguide 530, and directed towards a pixel 535, which it enters, ultimately redirecting the light out of the substrate and toward the viewer. In this embodiment, the optical design is such that the light redirected from the waveguides is simply directed toward the pixel and propagates in the planar waveguide segment between the waveguide and the pixel. Alternatively, light may propagate from the waveguide to the pixel by means of a second channel waveguide segment, confining the light in an additional dimension. The design enabling the redirected light to propagate in the planar waveguide segment eliminates both the optical loss associated with the insertion of a second optical channel waveguide and the process of forming the second waveguide. With additional modifications to the structure described, another embodiment would enable the redirected light from the channel waveguide to propagate to the pixel by means of a free-space propagation segment in the bulk of the substrate.

The thermo-optic applicators comprise conductive elements located on or in the surface of the optical waveguide structure 510 and in proper orientation to the waveguides 530 running under them. The conductive elements function as resistance heaters when connected to an electrical power source. In large displays involving hundreds or more applicators connected to a common conductor to form a column (or row), active elements may be found on different optical waveguides, and the cross-sectional area of the electrical power distribution conductor must be rather large. Metallization with evaporation or sputtering is not generally consistent with the deposition of thick films to accommodate the high currents. Another option is to provide relatively wide electrical conductors on the optical layer surface. However, in this embodiment, since it is also desired to have light emitted from the optical surface containing the applicators, i.e. the surface must contain both applicators and pixels, it would be difficult to locate electrical conductors of the proper width and thickness directly on the surface of the optical layer with the applicators. An advantageous location for the electrical conductors 540 supplying the applicator power is thus beneath the optical waveguide structure 510, a surface not containing the applicators and pixels. Such placement of the electrical conductors 540 forms the electrical distribution layer 545 and the restrictions on the width and thickness of the electrical conductors are thus reduced.

Electrical interconnections 550 (vias) through the optical waveguide structure 510 are utilized to connect the applicators 515 on the surface to the electrical conductors 540 in the electrical distribution layer 545. However, since the optical waveguide structure contains waveguides 530, propagation paths for the redirected light to reach the pixels, and the pixels themselves, routing options for the electrical vias through the optical waveguide structure are limited. In addition, in order to properly redirect the light from the waveguides and have a large portion of the light then enter the pixels, the applicators must be placed in very precise locations relative to the waveguides and the pixels. Given the many constraints on the geometry and position of the vias, the design task of locating properly sized vias from the electrical activation layer through the optical waveguide structure and connecting to the electrical distribution layer is difficult. One solution to the via design in accordance with the present invention is the use of the pixels as vias, forming both the optical and electrical paths as described herein.

The pixels 535 in this embodiment define openings through the waveguide layer 510 to the electrical conductors 540. Metallization of the side walls and bottoms of the pixels (e.g. by sputter coating with silver) can be used to form an electrical coupling path in the pixel. The metallization may be patterned in such a way that an opening 500 is left in the appropriate location for the entrance of light redirected from the waveguide 530. Such an opening may be attained by removing the metallization to ensure an aperture is created, and if methods such as lithography are used, may result in not only a portion of the pixel side wall metallization being removed, but removal of a portion of the pixel bottom metallization material also. Thus patterned metallization of the pixel can be carried out in such a way as to form electrical connections with the applicators on the upper optical layer surface. As long as an electrical connection is maintained between the applicator 515 and the electrical conductor 540, absence of a portion of the metallization on the side walls or the bottom of the pixel 535 is not considered detrimental to the operation of the device. Utilization of the pixels for both optical and electrical functions thus simplifies the overall design task and eliminates the need for a distinct fabrication operation associated with electrical-only vias.

The metallization for electrical conduction may also function as a reflector layer to improve pixel efficiency. If the metallization material is selected appropriately, for example, if it is selected from materials such as silver or gold, the amount of light emanating from the pixel to the viewer will be enhanced compared to a pixel without such a reflector layer.

Alternatively, if the pixel is to function as an out-of-plane reflector as described previously, metallization of the angled side walls of the pixel will be desirable to enable the reflection of the light out of the pixel to the viewer.

In yet another embodiment of the invention, the pixel is filled at least partially with a medium containing a re-radiator material 600, which provides for conversion of the input light to the light ultimately observed by the viewer. A re-radiator material may be any single or multi-component material that alters the properties of input light and from which output light emanates. The input light and the output light emerging may be of single or multiple wavelengths. For example, the re-radiator material may include a luminescent material (refer to "Luminescent Materials" by Blasse and Brabmaier, 1994, incorporated herein by reference) or a phosphor body that absorbs radiation at wavelengths shorter than the wavelength(s) of emission, or it may include phosphor that generates light at wavelengths longer than the input light wavelength at which it is excited, henceforth referred to as down-conversion phosphor, or it may include a phosphor that generates light at wavelengths shorter than the input light wavelength at which it is excited, henceforth referred to as an upconversion phosphor.

In the case in which the re-radiator material is an upconversion phosphor for example, the efficiency of the phosphor re-radiation from the pixel can be improved if the side walls and bottom (electrical distribution layer conductor) are metallized to function as reflectors. In this instance input light reaching the reflective coatings on the surface(s) of the pixel are reflected back into the medium, to be converted before being re-radiated towards the viewer.

The addition of a top reflector 555 to the pixel design described above, with an emission (top) aperture 560 may be useful for further optimizing the conversion efficiency of the medium containing the re-radiating material. This top reflector is typically an electrically conductive metal such as silver or gold which at least partially covers the top surface of the medium containing the re-radiator, and which is applied in a conventional metallization process such as sputtering, evaporation, or other such means known to those skilled in the art.

If desired, the top reflector can be used as part of the electrical coupling path, eliminating the need for the bottom reflector to be electrically conductive. For the higher efficiency pixel described above, the bottom reflector could be the same as the electrical conductors, eliminating the separate bottom reflector coating entirely. Alternatively, a pixel with only a top reflector and no bottom reflector could be implemented, if the lower efficiency attainable with the pixel geometry is acceptable. In such an architecture, the top reflector may be electrically connected to the electrical conductors in the electrical distribution layer to enable the display to operate as designed. Consequently, care should be taken to pattern the top reflector so that all electrical connections made suit the design of the display.

In the preferred embodiment, the top and bottom reflectors coexist. The electrically conductive bottom reflector enables ease of electrical connection between the applicators in the electrical activation layer and the electrical conductors in the electrical distribution layer. The combination of the top and bottom reflectors enables higher pixel efficiency to be achieved than would be possible with only a single reflector.

For operation of the display, the applicators are thus electrically connected to the electrical conductors. The electrical distribution layer 545 is connected through any suitable means to an external electronics package 565 capable of supplying power to the column/row electrical conductors in synchronization with the light supplied to the row waveguides. The pixel array can thus be scanned and produce full-motion images for viewing.

An integrated optical device utilizing elements of the present invention and which functions as a display as generally described above can be manufactured in the following manner.

The display panel is fabricated on a glass plate 520 with thickness of about 1 mm or other thickness sufficient to support handling of the display panel. The glass is cleaned using techniques commonly utilized in semiconductor manufacturing operations. These cleaning processes comprise ultrasonic detergent washing, plasma ashing, radio frequency (RF) plasma exposure, and de-ionized water rinses.

The next series of operations forms the electrical distribution layer 545. If desired, a layer is deposited onto the surface of the glass which acts as an adhesion promoter between the glass and the subsequently formed electrical conductors. For example, a nichrome layer is deposited by sputtering to a thickness of <0.5 $\mu$m. The highly electrically conductive electrical distribution layer material is subsequently deposited over the adhesion promoter to a thickness of 0.1 $\mu$m using for example a sputtering technique. The thickness of the electrical distribution layer material is determined by the electrical current which must be passed, the distance over which it must be carried, and the voltage drop allowed over the length of the conductor. Thicker and higher conductivity conducting materials will allow higher currents over larger lengths with lower voltage drops. The electrical distribution layer material is then patterned utilizing conventional microlithographic patterning and etching techniques to create a series of substantially parallel electrical conductors 540 in the region of concern by fully removing the undesired material in a series of stripes. In the case where a metallic (conductive) adhesion layer has been deposited beneath the electrical distribution layer material, the adhesion layer must also be removed in a similar series or stripes to prevent short circuits between conductors in the electrical distribution layer. This may again be accomplished by wet etch processing.

The next series of operations forms the optical waveguide structure 510. The thickness of the component layers and the dimensions of the waveguide itself can be calculated using techniques well known to those skilled in the art given the optical properties of.the polymeric materials which are chosen for use and the characteristics of the light energy which will eventually be launched into the waveguides.

To form the lower cladding layer 570, a selected material, for example, an ultraviolet light curing polymeric material, such as an acrylate, is deposited by a suitable technique, by spin coating for example, over the electrical distribution layer 545 and then cured. This layer is subsequently patterned using conventional microlithographic techniques and a suitable technique such as a reactive ion etching (RIE) process is utilized to form a series of substantially parallel channels of appropriate width and depth running approximately perpendicular to the underlying electrical conductors in the active area of the device. Other techniques for preparing channel waveguides are known in the art and some are described above with respect to the first embodiment of the invention and could be equally applied. The now-channeled lower cladding layer surface is cleaned and dried in preparation for the application of the core layer.

The core layer 575 is then applied to the lower cladding layer by, for example, spin coating a suitable polymeric material, for example a polyurethane, curing with ultraviolet light, and then baking. The material is chosen to have a sufficiently high index of refraction relative to the lower and upper cladding layers for proper confinement of at least one transverse mode in the channel waveguide being fabricated.

The upper cladding layer 580 is then applied to the core layer by for example spin coating and curing with ultraviolet light a suitable polymeric material, for example, an epoxy. The optical waveguide structure 510 now contains a series of parallel waveguides 530 running essentially perpendicular to the underlying electrical conductors 540 in the region of concern. Note that the waveguides do not have to be parallel (unlike the electrical conductors disposed, as it is possible for optical waveguides to intersect and cross without detrimental effect to the optical energy propagating in them).

The optical applicators in the form of electrodes are then formed in a series of metallization and patterning operations. The geometry and width of the these optical applicators are chosen so that they provide the thermal energy required to operate the switch. If considered necessary, a contact promoter layer may be deposited to act as an electrical contact promoter between the electrical activation layer and the electrical interconnection path metallization.

In an example, the optical waveguide structure 510 is metallized with a layer of nichrome, to form the electrical activation layer, with a thickness of <0.5 $\mu$m, and then with a contact promoter, silver, or gold for example, to about the same thickness. The contact promoter layer surface is then patterned utilizing 30 conventional microlithographic techniques to define the applicator locations 515, e.g. by spinning a layer of photoresist, exposing through a photomask and developing the resist to reveal the applicator pattern.

The contact promoter and nichrome are sequentially removed from those (non-applicator) areas of the metal surface exposed in turn to the different metal etchants. Various proprietary etchant formulations for commonly used metals are well known in the art and are available from companies such as Transene. The electrical activation layer pattern is ultimately revealed.

The next step is to remove the contact promoter material from the applicator region, except at defined areas termed "pads", which will subsequently be used as connection points from the applicators to the electrical vias providing connection to the underlying electrical conductors. Once again, conventional microlithographic techniques are utilized to remove the contact promoter from the applicators.

The next series of operations forms the pixels 535, each of which is located over an electrical conductor and between a pair of waveguides. The first step is to form vias 550 in the optical layer at the locations where pixels 535 are desired. The optical waveguide structure is patterned utilizing conventional microlithographic techniques to define the location of the vias in an overlying photoresist layer. This patterned surface is then exposed to, for example, an RIE process to form vias by removing the optical layer through to the electrical conductors in the electrical distribution layer in those areas of the optical waveguide structure that are exposed to the RIE process by the patterns in a photoresist layer. The photoresist layer is then removed to yield an optical waveguide structure containing.an array of vias 550 and the previously formed applicators 515 and contact promoter pads 595.

The next step in pixel formation is to metallize the pixels to form reflectors 585 and electrical vias. Once again, the metallization should adhere to the surfaces of the pixels so an adhesion promoter may be utilized. The optical waveguide structure and its elements are metallized by depositing a electrically conductive material to from the electrical interconnection metallization layer. This can be achieved by, for example, sputter coating with a material such as silver or gold to an appropriate thickness, say <1 $\mu$m, dependent on the electrical current which must be carried through the via and the interconnect. To define the locations which allow light redirected out of the waveguide to enter the pixel, and to define the electrical conducting paths from the sides of the pixel 585 to the contract promoter pads 595 on the applicators, an electrical interconnection metallization layer is patterned utilizing conventional photolithographic techniques, for example photoresist deposition, imaging and developing, followed by wet etching.

The next step in the manufacture of this array is the addition of a re-radiator medium, for example a phosphor body 600, to the pixel vias using an appropriate deposition process, for example inkjet printing, volumetric deposition or screen printing.

The final step in the manufacture of this array is the addition of a metallized reflector 555 on the re-radiator in the pixels. The array is metallized by depositing a reflective material, for example sputtering with Ag or gold to a thickness of about <1 $\mu$m. The array is then patterned utilizing microlithographic techniques to allow the subsequent removal by etching of the reflective material from all areas surrounding the pixels and from a portion of the surface of the pixels to create apertures 560 in the reflector to allow for the emission of light energy. Processes such as wet etching, dry etching, or excimer laser ablation may be employed to define the emission apertures in the pixel metallization.

It should be recognized that the foregoing description concerning the number and ordering of process operations, and series of operations, sets forth one exemplary method for constructing one embodiment of the invention. Numerous alternatives to the aforementioned process sequence, as well as partial performance of certain operations or series interlaced with partial performance of other operations or series, exist and are within the contemplated scope of the invention.

In some applications, it is advantageous to provide a black matrix coating/layer (not shown) over the pixelated surface of the display in order to improve the visual contrast of the display. This layer could be provided through a combination of coating and patterning processes to ensure that light could still escape from the pixels toward the viewer. This black matrix could also be provided through a lamination process, with appropriate provision for registration, of a material that is uniformly black except for transmission windows for light emitted from the pixel apertures.

Separately or in addition to the black matrix coating/layer, it might be advantageous to provide an optically clear and transparent protective coating/layer (not shown) over the pixelated surface. This coating/layer could be provided through coating and/or laminating processes.

To the waveguide display 400, may be coupled to light source and associated electronics for driving and synchronizing the column electrical conductors to yield a completed functional display, as illustrated in FIG. 1.

It is understood that the specific embodiment of the display described herein, and its fabrications as described herein, represents only one embodiment of the present invention, and alternative embodiments may be considered by those skilled in the art. For example, the alternative embodiments described herein for the fabrication of optical integrated circuits may be applied to the fabrication of the display. Other processes known in the art may also be used to fabricate the display without significantly altering its functionality in the spirit of the invention.

The invention has now been explained with reference to specific embodiments. Other embodiments will be apparent to those of ordinary skill in the art. Therefore it is not intended that the invention be limited, except as indicated by the appended claims, which form a part of this invention description.

What is claimed is:

1. An optical device comprising:
   at least first and second electrical conductors;
   at least one optical layer overlying at least a portion of said at least first and second electrical conductors, said at least one optical layer including at least one optical waveguide;
   at least one applicator proximate to said at least one optical layer; and
   an electrical coupling path between said at least one applicator and one of said first or second electrical conductors, at least a portion of said coupling path traversing at least a portion of said at least one optical layer.

2. The optical device of claim 1 wherein said at least first and second electrical conductors are arranged substantially parallel to each other.

3. The optical device of claim 1 wherein said at least one optical layer comprises a first cladding layer and a second cladding layer on opposing sides of a core layer.

4. The optical device of claim 1 wherein said optical device further includes at least one feature, and said feature includes said electrical coupling path.

5. The optical device of claim 1 wherein said applicator controls an optical grating.

6. The optical device of claim 1 wherein said applicator comprises a heating element for a thermo-optic switch.

7. The optical device of claim 1 wherein said applicator comprises an electrodes for an electro-optic switch.

8. The optical device of claim 1 wherein said applicator controls an optical redirector which operates by reflection.

9. The optical device of claim 1 wherein said applicator controls an optical redirector which operates by suppressing or inducing waveguiding properties in a optical waveguide.

10. The optical device of claim 1 wherein the first and second conductors are constructed substantially in a first planar layer, the waveguide is constructed in a second planer layer overlying the first planar layer, and the applicator is constructed in a third planar layer overlying the second planar layer.

11. The optical device of claim 1 further including a phosphor body formed on said electrical coupling path.

12. The optical device of claim 1 wherein said first and second electrical conductors are formed of a conductive material on a substrate and separated by a filler material.

13. The optical device of claim 1 further including a pixel adjacent to said applicator.

14. The optical device of claim 1 wherein said electrical coupling path is optically reflective.

15. The optical device of claim 1 further including a pixel, and wherein said electrical coupling path is reflective and comprises at least a portion of said pixel.

16. The optical device of claim 1 wherein said electrical coupling path comprises silver.

17. The optical device of claim 1 wherein the waveguide consists of at least one polymer material.

18. The optical device of claim 1 further including a pixel and a receiving structure positioned proximate to the pixel and the applicator.

19. The optical device of claim 4 wherein said feature comprises a pixel.

20. The optical device of claim 4 wherein said feature comprises an optical redirector.

21. The optical device of claim 4 wherein said feature comprises an optical re-emitter.

22. The optical device of claim 4 wherein said feature comprises a re-radiator.

23. The optical device of claim 4 wherein said feature comprises a thermal conductor.

24. The optical device of claim 4 wherein said feature comprises an alignment marker.

25. The optical device of claim 10 wherein said electrical coupling path passes though said second planar layer.

26. The optical device of claim 11 wherein said phosphor body is formed substantially in a via on said electrical coupling path.

27. The optical device of claim 13 wherein said pixel includes a re-radiator.

28. The optical device of claim 27 wherein said re-radiator is positioned at least partially on said electrical coupling path.

29. The optical device of claim 28 wherein said re-radiator comprises a luminescent substance.

30. The optical device of claim 28 wherein said re-radiator comprises an upconversion phosphor.

31. The optical device of claim 28 wherein said re-radiator comprises a scattering center.

32. The optical device of claim 28 wherein the re-radiator is positioned substantially in a via on said electrical coupling path.

33. The optical device of claim 14 wherein the pixel contains a re-radiator and said re-radiator is positioned at least partially on said electrical coupling path.

34. The optical device of claim 18 wherein said receiving structure comprises a second waveguide.

35. The optical device of claim 18 wherein said receiving structure comprises a refractive index structure capable of directing optical energy.

36. The optical device of claim 18 wherein said receiving structure comprises an inducible waveguide structure.

* * * * *